United States Patent [19]

McLafferty

[11] 4,112,388
[45] Sep. 5, 1978

[54] AERODYNAMIC WINDOW METHOD AND APPARATUS

[75] Inventor: George H. McLafferty, Manchester, Conn.

[73] Assignee: United Technologies Corporation, Hartford, Conn.

[21] Appl. No.: 701,347

[22] Filed: Jun. 30, 1976

[51] Int. Cl.² ........................... H01S 3/05; H01S 3/22
[52] U.S. Cl. ........................... 331/94.5 D; 331/94.5 C; 331/94.5 G; 350/319
[58] Field of Search ............... 331/94.5 C, 94.5 D, 331/94.5 G, 94.5 T; 350/319

[56] References Cited
U.S. PATENT DOCUMENTS

| 3,617,928 | 11/1971 | Hausmann | 331/94.5 C |
| 3,654,569 | 4/1972 | Hausmann | 331/94.5 C |
| 3,907,409 | 9/1975 | Hausmann | 331/94.5 D |
| 3,918,800 | 11/1975 | Griffin | 350/319 |

*Primary Examiner*—William D. Larkins
*Attorney, Agent, or Firm*—Prutzman, Hayes, Kalb & Chilton

[57] ABSTRACT

A laser aerodynamic window with different inside and outside gas stream components having effective stagnation indices of refraction corresponding to the indices of refraction of the gases on the opposite sides of the aerodynamic window so that the turbulent shear zones formed therewith respectively have substantially uniform stagnation indices of refraction for substantially eliminating unsteady laser beam distortion.

6 Claims, 1 Drawing Figure

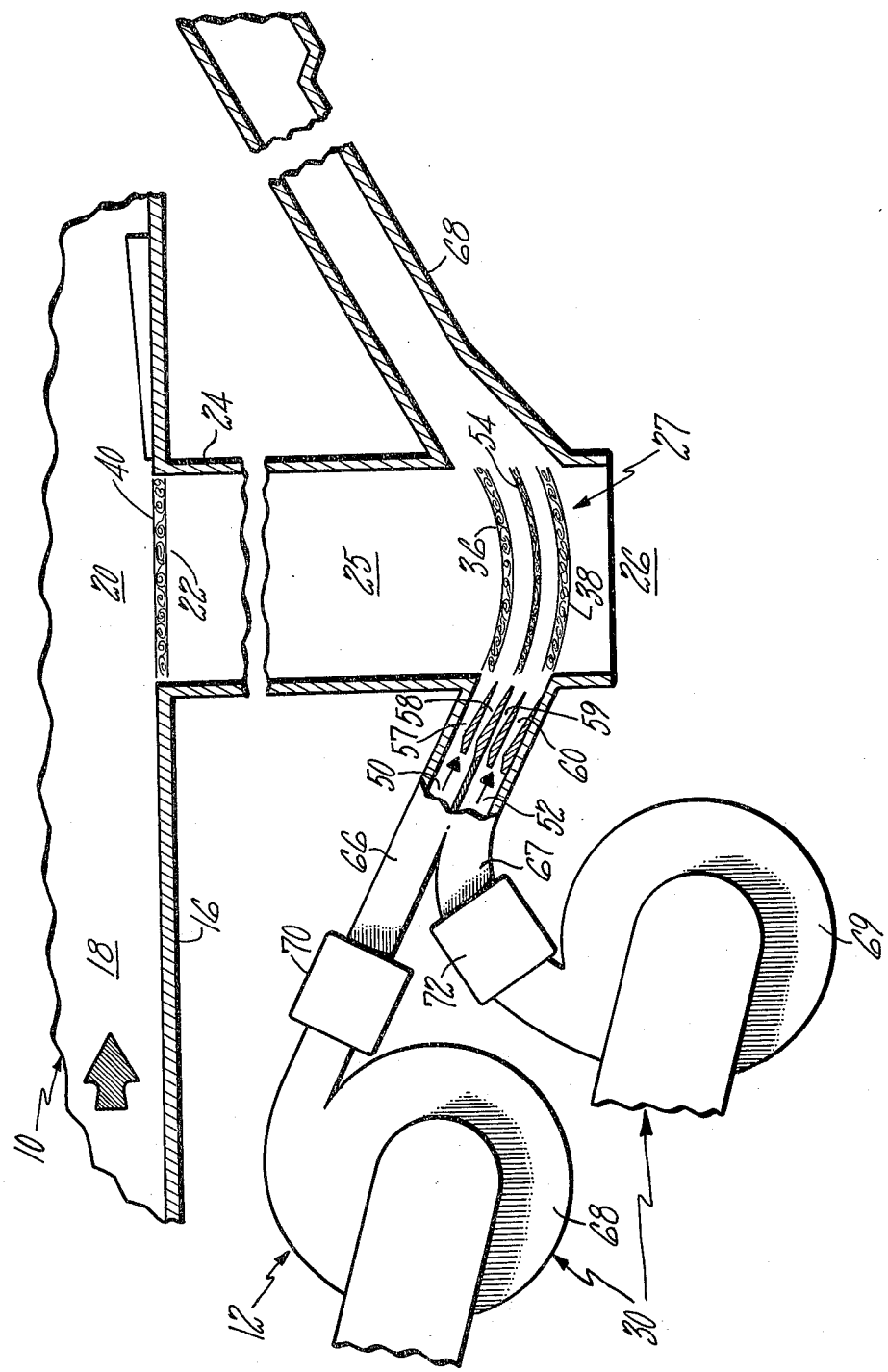

AERODYNAMIC WINDOW METHOD AND APPARATUS

BRIEF SUMMARY OF THE INVENTION

The present invention relates generally to aerodynamic windows of the type having notable utility in the transmission of laser beams from a relatively low pressure laser beam source to a relatively high pressure region such as the atmosphere, and more particularly to new and improved aerodynamic window method and apparatus for the transmission of laser or other collimated optical beams with reduced unsteady beam distortion between different gas regions.

It is a primary object of the present invention to provide new and improved aerodynamic window method and apparatus for transmitting laser or other collimated optical beams with reduced unsteady beam distortion between gas regions having different indices of refraction.

It is another object of the present invention to provide new and improved aerodynamic window method and apparatus for transmitting laser or other collimated optical beams with reduced unsteady beam distortion from a relatively low pressure beam source to a relatively high pressure region.

It is a further aim of the present invention to provide new and improved aerodynamic window method and apparatus for transmitting laser or other collimated optical beams with minimum unsteady distortion between separate gas regions having gases with substantially different indices of refraction, due for example to different gas temperatures, pressures and/or different molecular weights.

Other objects will be in part obvious and in part pointed out more in detail hereinafter.

A better understanding of the invention will be obtained from the following detailed description and the accompanying drawing of an illustrative application of the invention.

BRIEF DESCRIPTION OF THE DRAWING

In the drawing:

The FIGURE is a generally diagrammatic view, partly broken away and partly in section, of a laser beam generator having an aerodynamic window system incorporating an embodiment of the present invention.

DESCRIPTION OF THE PREFERRED EMBODIMENTS

Referring now to the drawing in detail wherein like numerals represent like parts, there is shown an exemplary gas dynamic laser beam generator 10 having an aerodynamic window system 12 incorporating an embodiment of the present invention. For simplicity of understanding, the aerodynamic window system 12 which is shown is generally like that disclosed in U.S. Pat. No. 3,873,939 of Roy N. Guile et al, dated Mar. 25, 1975 and entitled "Aerodynamic Window". Briefly, the gas dynamic laser has an elongated rectangular channel 16 and for example employs a supersonic gas flow system using a laser gas mixture of 15% $CO_2$ 84% $N_2$ and 1% $H_2O$ and a constant average flow velocity of 2000 meters per second, from left to right as viewed in the FIGURE, through the elongated channel cavity 18. The static pressure and stagnation temperature of the supersonic gas mixture at the laser discharge region 20 of the channel cavity 18 are for example 100 Torr and 1500° Kelvin respectively.

A suitably located and dimensioned transverse channel opening 22 and aligned conduit 24 provide an obstruction-free passageway 25 for the transmission of a laser beam from the laser region 20 to an external region 26, which for example may be an atmospheric region at standard sea level pressure, temperature and humidity. An aerodynamic window 27 is provided across the passageway 25 to permit unobstructed transmission of laser beams outwardly from the relatively low pressure laser region 20 to the relatively high pressure atmospheric region 26 with little or no inward flow to the low pressure channel cavity 18 via the unobstructed light transmission passageway 25.

An aerodynamic window gas flow system 30 provides for discharging a supersonic gas flow across the laser transmission passageway 25 in a predesigned manner to provide the desired aerodynamic window effect. Excepting as described hereinafter in connection with the description of the present invention, the aerodynamic window gas flow system 30 can be designed in any one of many ways for establishing the desired aerodynamic window flow across the laser transmission passageway.

As a result of the high velocity aerodynamic window flow across the laser transmission passageway 25, turbulent shear zones or layers 36, 38 are formed along the opposite inside and outside faces of the aerodynamic window 27. Also, a similar turbulent shear zone 40 is present at the entrance opening 22 to the light transmission passageway 25, although in some configurations, the shear zones 36, 40 may provide in effect a single or combined shear zone. In general, the temperature, pressure and molecular weight of the gas in the laser discharge region 20 and therefore adjacent the inside face of the aerodynamic window 27 are substantially different than the temperature, pressure and molecular weight of the gas of the external gas region 26 and therefore adjacent the outside face of the aerodynamic window 27. Also, as in aerodynamic windows employing air as the aerodynamic window medium, there is typically a substantial difference between the molecular weight and stagnation temperature of the aerodynamic window gas and the gas of the laser region 20.

The differences in the time-averaged indices of refraction between the different regions through which the optical beam passes causes a time-averaged distortion of the beam phasefront. This time-averaged distortion may represent a simple change in beam direction, a simple radius of curvature of the phasefront, or some more complex phasefront distribution. The phasefront tilt of radius of curvature can be corrected for by tilting a mirror or changing the radius of curvature of some mirror in the system. Correcting for the steady-state phasefront distortion which is more complex than a simple radius requires a more complex mirror correcting surface shape. The correction of the steady-state phasefront distortion causes by the passage of a beam through the different regions of an aerodynamic window is not the subject of the present invention.

In addition to the steady-state phasefront distortion, there is an unsteady phasefront distortion caused by "turbles" in the shear regions between the aerodynamic wndow gases and the relatively stationary gases on either side of the aerodynamic window flow. For the simplest case of a gas Prandtl number of one, these turbles will cause an unsteady variation in the phasefront if the stagnation index of refraction of the two gases on the sides of the shear region are different. However, if the stagnation index of refraction of the gases on the sides of the shear region are approximately equal to each other, then two adjacent turbles at the same static pressure and the same velocity will have the same local index of refraction, so that there will be little or no unsteady distortion of the laser beam phasefront. In the more general case in which the Prandtl number of the gases is different from one (it is usually somewhat less than 1.0), the stagnation index of refraction of the two different gases must be made slightly different so that the local index of refraction for two adjacent turbles composed of different mixtures of the two different gases are approximately the same. The aerodynamic phenomena involved are sufficiently complex that the exact difference between the stagnation index of refraction of the aerodynamic window stream and the adjacent relatively stationary stream which will result in minimum unsteady phasefront distortion should be determined by experiment. However, for the sake of the following discussion, the phrase "equal stagnation index of refraction" refers to a combination of stagnation index of refraction values which will minimize the unsteady phasefront distortions.

Also, there may be substantial differences between the stagnation temperature and/or molecular weights of the aerodynamic window gas and the external gas region 26 and whereby the outside turbulent shear zone 38 would be composed of a turbulent mixture of gases having different stagnation indexes of refraction and which will therefore cause unsteady phasefront distortion of a laser beam transmitted therethrough.

In accordance with the present invention, an aerodynamic window gas medium is employed for substantially reducing or eliminating the unsteady stagnation index of refraction gradient within the opposed shear zones 36, 38 and so as to thereby reduce or eliminate the unsteady phasefront distortion of a laser beam transmitted through the shear zones. For that purpose, an aerodynamic window gas medium is employed having different inside and outside gas components 50, 52 with different molecular weights and/or different stagnation temperatures and so as to have different stagnation indices of refraction corresponding to the different stagnation indices of refraction adjacent the inside and outside surfaces of the aerodynamic window 27. Thus, the temperature and molecular weight of the outside gas component 52 is chosen so that its stagnation index of refraction within the outer turbulent shear zone 38 is the same or approximately the same as the index of refraction of the external gas region 26 and whereby the index of refraction gradient within the outside shear layer 38 would be substantially reduced or eliminated. Similarly, the inside gas component 50 of the aerodynamic window is chosen so that its stagnation index of refraction within the inside turbulent shear zone 36 is the same or approximately the same as the stagnation index of refraction of the internal gas region and whereby the unsteady index of refraction gradient within the inside shear layer 36 is substantially reduced or eliminated.

The described dual stream aerodynamic window provides an additional shear zone 54 at the interface of the two stream components 50, 52; however, the thickness of the intermediate shear zone 54 is minimized by using two parallel gas stream components 50, 52 having generally the same velocity. The intermediate shear zone turbulence would be less where the velocity of the two component streams are approximately equal since only minimal shearing action would be produced at their interface, largely caused by the wake created by the boundary layer growth of the nozzles 57–60 used to accelerate the two gas stream components 50, 52. Nonetheless, it is believed that even if the velocities of the two components 50, 52 adjacent their interface were substantially different, the total unsteady laser beam phasefront distortion within the laser beam transmission passageway 25 would be substantially reduced by the described duel stream aerodynamic window. Thus, it should be appreciated that the described dual stream aerodynamic window method can be applied in general to any type of aerodynamic window configuration for reducing beam distortion.

In the illustrated embodiment, the aerodynamic window gas flow system 30 (which, it is contemplated, may be a recirculating gas flow system in some applications) comprises a pair of nozzles 57, 58 and 59, 60 for each gas component 50, 52; a total of four separate nozzles 57–60 for use as described in the aforementioned U.S. Pat. No. 3,873,939. The pairs of nozzles are mounted within separate conduits 66, 67 and provide in combination with a downstream conduit 68 for conducting the supersonic gas stream components 50, 52 together across the laser transmission passageway 25 to produce the described dual component aerodynamic window. A suitable return conduit (not shown) may be provided where the aerodynamic window gas stream components are recirculated, and a pair of separate preferably independently controllable blowers or pumps 68, 69 are provided for circulating the two gas components 50, 52. Also, separate and independently controllable heat exchangers 70, 72 may be provided for the two gas stream components 50, 52 respectively preferably downstream of the blowers 68, 69 for controlling the temperature of each gas component. Each heat exchanger 70, 72 may be used to lower or raise the temperature of the respective gas stream component 50, 52 as desired.

In the preferred embodiment of the invention, the temperature of each gas stream component 50, 52 is established so that its stagnation temperature is approximately equal to the stagnation temperature of the adjacent gas region. In general, for a moving gas stream, the actual stagnation temperature will be approximately 80% of the calculated stagnation temperature under ideal adiabatic conditions. Thus, in the case of the outside gas stream component 52, it would be heated or cooled with the heat exchanger 72 so that its adiabatic stagnation temperature is slightly higher than the ambient temperature of the outside region 26. Likewise, the inside gas stream component 50 would be heated or cooled to have an adiabatic stagnation temperature slightly higher than the actual temperature of the adjacent gas region. As a result, there will be little if any temperature gradient within the turbulent shear zones 36, 38. Similarly, in the preferred embodiment, the molecular weight of each gas component 50, 52 is preferably the same or approximately the same as the molecular weight of the gas in the corresponding adjacent gas region. Thus, where the gas in the outside gas region 26 is air, air would preferably be used as the outside gas component 52. Likewise, the inside gas component 50 would preferably have the same molecular weight and also preferably hve the same composition as the gas employed in the laser region 20. Alternatively, a different gas composition could be used having approximately the same molecular weight and for example composed of the proper percentages of helium and nitrogen.

Accordingly, each turbulent shear zone or layer 36, 38 would be composed of gases having substantially the same temperature and molecular weight and therefore a relatively constant index of refraction. The intermediate shear zone 54 at the interface of the two gas components 50, 52 would produce little phase-front distortion because of its minimal thickness.

Other gases could be used as the gas components 50, 52 to produce the desired result of forming turbulent shear zones 36, 38 composed of gases having the same or nearly the same indices of refraction. It is also contemplated that the same gas composition could be used for both components 50, 52 but with the gas components having different stagnation temperatures established so that their stagnation indices of refraction are the same or approximately the same as the indices of refraction of the corresponding adjacent gas regions. Thus, a gas component 50 and/or 52 may be used having a molecular weight different than the molecular weight of the corresponding adjacent gas region, in which case, its stagnation temperature would be established so that its stagnation density would be approximately the same as the density of the corresponding gas region and therefore so that their indices of refraction would be approximately the same.

Thus, a dual stream aerodynamic window provided by the present invention will provide for substantially reducing unsteady phasefront distortion of a laser beam and particularly short wavelength beams because they are more affected by index of refraction gradients.

As will be apparent to persons skilled in the art, various modifications, adaptations and variations of the foregoing specific disclosure can be made without departing from the teachings of the present invention.

I claim:

1. A method of producing an aerodynamic window between two different gas regions of an optical transmission passageway having different indices of refraction, comprising the steps of producing a multiple component aerodynamic window gas stream across the optical transmission passageway having two separate high velocity gas stream components across the optical transmission passageway and at opposite sides respectively of the aerodynamic window adjacent to and forming turbulent shear zones with the two different gas regions respectively, and providing said two separate gas stream components with substantially different stagnation indices of refraction generally the same as the different indices of refraction of the adjacent gas regions respectively so that each of the turbulent shear zones has a generally uniform stagnation index of refraction.

2. A method of producing an aerodynamic window according to claim 1 wherein the multiple component aerodynamic window gas stream is produced with an intermediate shear zone between said two separate gas stream components and with said two separate gas components having approximately the same velocity adjacent said intermediate shear zone to reduce the thickness thereof.

3. A method of producing an aerodynamic window according to claim 1 wherein the two different gas regions have substantially different molecular weights and wherein each of the two separate gas stream components has approximately the same molecular weight as the respective adjacent gas region.

4. A method of producing an aerodynamic window according to claim 1 wherein the two separate gas stream components have approximately the same composition and have substantially different stagnation temperatures to produce said different stagnation indices of refraction.

5. In an aerodynamic window system for producing an aerodynamic window between the first and second separate gas regions with substantially different static pressures and indices of refraction and comprising first conduit means for connecting the separate gas regions and providing an unobstructed optical beam transmission passageway therebetween, and aerodynamic window producing means having second conduit means intersecting the first conduit means and operable for discharging a high velocity gas medium across the optical beam transmission passageway to produce an aerodynamic window for preventing substantial gas flow through the passageway between said gas regions, the improvement wherein the second conduit means provides first and second separate passageways upstream of the aerodynamic window for discharging first and second different aerodynamic window gas medium components respectively at high velocity across the optical beam transmission passageway and at opposite sides of the aerodynamic window adjacent to said first and second gas regions respectively, and wherein the aerodynamic window producing means provides for discharging through the first and second separate passageway sections, said first and second gas medium components respectively having substantially different stagnation indices of refraction which are generally the same as the different indices of refraction of said first and second gas regions respectively, and so as to produce a said aerodynamic window with turbulent shear zones on opposite sides thereof having substantially uniform stagnation indices of refraction respectively.

6. In a laser generator having an unobstructed laser transmission passageway connecting two separate gas regions with substantially different static pressures and indices of refraction, and aerodynamic window producing means for producing an aerodynamic window across the laser transmission passageway between said two separate gas regions for preventing substantial gas flow therebetween through the laser transmission passageway, the improvement wherein the aerodynamic window gas stream producing means produces a said aerodynamic window with at least two different high velocity gas stream components across the laser transmission passageway on opposite sides of the aerodynamic window adjacent to and forming turbulent shear zones with the two gas regions respectively and having substantially different stagnation indices of refraction generally the same as the different indices of refraction of the corresponding gas regions respectively and so as to form turbulent shear zones therewith respectively, each having a generally uniform stagnation index of refraction.

* * * * *